US011475242B2

(12) United States Patent
Mukherjee et al.

(10) Patent No.: US 11,475,242 B2
(45) Date of Patent: Oct. 18, 2022

(54) DOMAIN ADAPTATION LOSSES

(71) Applicant: SEIKO EPSON CORPORATION, Tokyo (JP)

(72) Inventors: Dibyendu Mukherjee, Scarborough (CA); Chen Xuan Cui, Toronto (CA)

(73) Assignee: SEIKO EPSON CORPORATION, Tokyo (JP)

( * ) Notice: Subject to any disclaimer, the term of this patent is extended or adjusted under 35 U.S.C. 154(b) by 175 days.

(21) Appl. No.: 16/939,588

(22) Filed: Jul. 27, 2020

(65) Prior Publication Data

US 2022/0027671 A1 Jan. 27, 2022

(51) Int. Cl.
*G06K 9/62* (2022.01)
*G06T 15/20* (2011.01)
*G06T 7/73* (2017.01)
*G06T 15/04* (2011.01)
*G06V 20/64* (2022.01)

(52) U.S. Cl.
CPC ......... *G06K 9/6256* (2013.01); *G06K 9/6262* (2013.01); *G06T 7/75* (2017.01); *G06T 15/04* (2013.01); *G06T 15/205* (2013.01); *G06V 20/64* (2022.01); *G06T 2207/20081* (2013.01)

(58) Field of Classification Search
CPC ......... G06T 7/75; G06T 15/04; G06T 15/205; G06T 2207/20081
See application file for complete search history.

(56) References Cited

U.S. PATENT DOCUMENTS

| | | |
|---|---|---|
| 9,047,706 B1 | 6/2015 | Ogale |
| 9,213,892 B2 | 12/2015 | Heisele |
| 10,235,771 B2 | 3/2019 | Rad et al. |
| 10,306,203 B1 | 5/2019 | Goyal et al. |
| 2013/0135315 A1 | 5/2013 | Bares et al. |
| 2015/0154679 A1 | 6/2015 | Fonte et al. |
| 2015/0154806 A1 | 6/2015 | Ogale |
| 2015/0243031 A1 | 8/2015 | Narasimha et al. |
| 2016/0041625 A1* | 2/2016 | Maizels ............ H04N 13/189 345/419 |

(Continued)

OTHER PUBLICATIONS

Kehl et al.; "SSD-6D: Making RGB-Based 3D Detection and 6D Pose Estimation Great Again;" Proceedings of the International Conference on Computer Vision (ICCV 2017); Venice, Italy; 2017.

(Continued)

*Primary Examiner* — Terrell M Robinson
(74) *Attorney, Agent, or Firm* — Oliff PLC

(57) ABSTRACT

A non-transitory computer readable medium embodies instructions that cause one or more processors to perform a method. The method includes selecting a 3D model corresponding to an object, and generating a first 2D image of the 3D model in a first pose. The method further includes generating a second 2D image of the 3D model in the first pose, the second 2D image having a different texture on the 3D model than the first 2D image. The method further includes, using an algorithm, determining a first location of a first feature on the 3D model in the first 2D image and a second location of a second feature on the 3D model in the second 2D image. The method further includes calculating a difference based on the first location and the second location. The method further includes adjusting parameters representing the algorithm based on the calculated difference.

16 Claims, 9 Drawing Sheets

(56) References Cited

U.S. PATENT DOCUMENTS

| | | | |
|---|---|---|---|
| 2016/0210783 A1* | 7/2016 | Tomlin | G02B 27/00 |
| 2017/0098124 A1 | 4/2017 | Jonsson et al. | |
| 2017/0206422 A1* | 7/2017 | Delbruck | G06V 20/40 |
| 2017/0357332 A1* | 12/2017 | Balan | G06F 3/017 |
| 2018/0137366 A1 | 5/2018 | Szeto et al. | |
| 2018/0144500 A1 | 5/2018 | Lam et al. | |
| 2018/0199039 A1 | 7/2018 | Trepte | |
| 2018/0300880 A1 | 10/2018 | Fan et al. | |
| 2019/0147221 A1* | 5/2019 | Grabner | G06T 7/75 382/103 |
| 2019/0184571 A1 | 6/2019 | Hou | |
| 2019/0318201 A1 | 10/2019 | Ahmed et al. | |

OTHER PUBLICATIONS

Rad et al.; "BB8: A Scalable, Accurate, Robust to Partial Occlusion Method for Predicting the 3D Poses of Challenging Objects without Using Depth;" International Conference on Computer Vision; vol. 1, No. 4; 2017.

Sandler et al.; "MobileNetV2: Inverted Residuals and Linear Bottlenecks;" Proceedings of the IEEE Conference on Computer Vision and Pattern Recognition; 2018.

Hinterstoisser et al.; "Model Based Training, Detection and Pose Estimation of Texture-Less 3D Objects in Heavily Cluttered Scenes;" Asian Conference on Computer Vision; Springer; Berlin, Heidelberg; 2012.

Su et al.; "Render for CNN: Viewpoint Estimation in Images Using CNNs Trained with Rendered 3D Model Views;" Proceedings of the IEEE International Conference on Computer Vision; 2015.

Tekin et al.; "Real-Time Seamless Single Shot 6D Object Pose Prediction;" arXiv preprint arXiv: 1711.08848 2 (2017).

Rambach, et al. "Learning 6DoF Object Poses from Synthetic Single Channel Image." Proceedings of the 17th IEEE International Symposium on Mixed and Augmented Reality, pp. 1-9 (2017).

Huang, et al. "Speed/accuracy trade-offs for modern convolutional object detectors ", Object Detection API, pp. 1-21 (2017).

Brachman, et al. "Uncertainty-Driven 6D Pose Estimation of Objects and Scenes from a Single RGB Image." In Proceedings of the IEEE Conference on Computer Vision and Pattern Recognition, pp. 3364-3372 (2016).

Do, et al. Deep-6Dpose: Recovering 6D Object Pose from a Single RGB Image. arXiv preprint arXiv:1802.10367, pp. 1-9 (2018).

Everingham, et al. "The Pascal Visual Object Classes (VOC) Challenge." International Journal of Computer Vision, vol. 88, pp. 303-338 (2010).

Hodan, et al. "T-LESS: An RGB-D dataset for 6D pose estimation of texture-less objects." IEEE Winter Conference on Applications of Computer Vision (WACV), pp. 1-9 (2017).

Howard, et al. Mobilenets: Efficient Convolutional Neural Networks for Mobile Vision Applications. arXiv preprint arXiv:1704 04861, pp. 1-9 (2017).

Li, et al. "Deepim: Deep Iterative Matching for 6D Pose Estimation." arXiv preprint arXiv:1804.00175, pp. 1-24 (2018).

Liu, et al. "SSD: Single Shot Multibox Detector." European Conference on Computer Vision, pp. 21-37 (2016).

Rad, Mahdi; Oberweger, Markus and Lepetit, Vincent. "Domain Transfer for 3D Pose Estimation from Color Images without Manual Annotations." arXiv preprint arXiv:1810.03707, pp. 1-16 (2018).

Rad, Mahdi; Oberweger, Markus and Lepetit, Vincent. "Feature Mapping for Learning Fast and Accurate 3D Pose Inference from Synthetic Images." Proceedings of the IEEE Conference on Computer Vision and Pattern Recognition, pp. 4663-4672 (2018).

Tejani, et al. "Latent-Class Hough Forests for 3D Object Detection and Pose Estimation." In European Conference on Computer Vision, pp. 462-477 (2014).

Tjaden, Henning; Schwanecke, Ulrich and Schömer, Elmar. "Real-time Monocular Pose Estimation of 3D Objects Using Temporally Consistent Local Color Histograms." Proceedings of the IEEE International Conference on Computer Vision, pp. 124-132.

Xiang, et al. "PoseCNN: A Convolutional Neural Network for 6D Object Pose Estimation in Cluttered Scenes." arXiv preprint arXiv:1711. 00199, pp. 1-9 (2017).

Montillo et al.; "Entangled Decision Forests and their Application for Semantic Segmentation of CT Images;" Biennal International Conference on Information Procession in Medical Imagine; Springer, Berlin, Heidelberg; Jul. 2011; (13 pages).

Gall et al; "Class-Specific Hough Forests for Object Detection;" Decision forests for computer vision and medical image analysis; Springer, London; (8 pages).

Hinterstoisser, Stefan, et al. "Gradient response maps for real-time detection of textureless objects." IEEE transactions on pattern analysis and machine intelligence 34.5 (2011): 876-888 (Year: 2011).

Jiang, Yijun, et al. "CNN-Based Non-contact Detection of Food Level in Bottles from RGB Images." International Conference on Multimedia Modeling. Springer, Cham, 2019 (Year: 2019).

Oct. 21, 2020 Office Action Issued in U.S. Appl. No. 16/750,700.

Zakharov et al.; "3D Object Instance Recognition and Pose Estimation Using Triplet Loss with Dynamic Margin;" IEEE/RSJ International Conference on Intelligent Robots and Systems (IROS); pp. 552-559; Sep. 24, 2017.

Lin et al.; "Focal Loss for Dense Object Detection;" IEEE International Conference on Computer Vision; pp. 2999-3007; 2017.

Jan. 13, 2021 Office Action issued in U.S. Appl. No. 16/746,171.

Jun. 18, 2021 Office Action Issued in U.S. Appl. No. 16/750,700.

Brachmann et al.; "Learning 6D Object Pose Estimation Using 3D Object Coordinates;" European Conference on Computer Vision; Springer, Cham; 2014.

May 5, 2021 Notice of Allowance and Fee(s) Due issued in U.S. Appl. No. 16/710,846.

Sep. 22, 2021 Office Action issued in U.S. Appl. No. 16/750,700.

Oct. 7, 2021, Requirement for Restriction/Election issued in U.S. Appl. No. 16/746,171.

Feb. 24, 2021 Office Action issued in U.S. Appl. No. 16/750,700.

Jan. 7, 2021 Office Action Issued in U.S. Appl. No. 16/710,846.

Apr. 28, 2022 Office Action Issued in U.S. Appl. No. 16/746,171.

* cited by examiner

S706' — WHEN THE CALCULATED DIFFERENCE IS LOWER IN THE SECOND ITERATION, UNDO THE ADJUSTMENTS TO THE ALGORITHM MADE IN S510
FIG. 7B
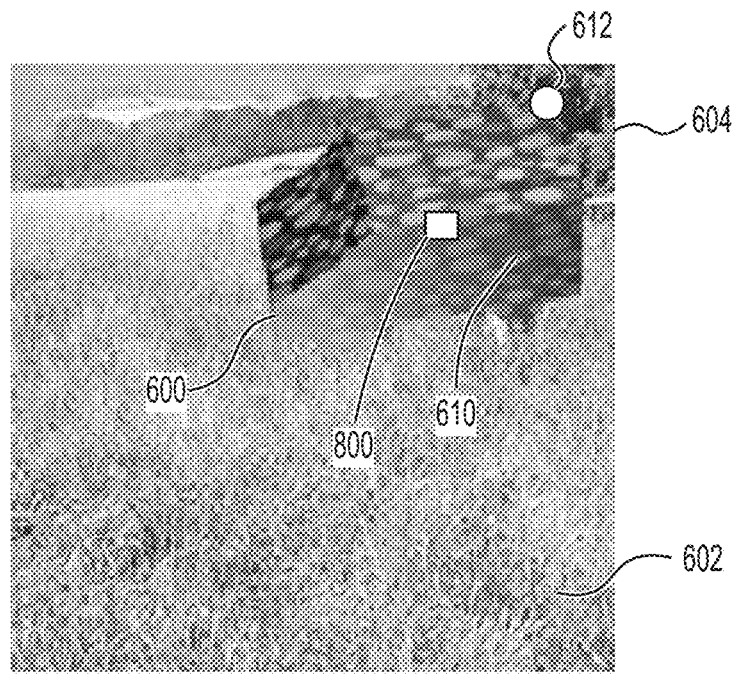
FIG. 8A
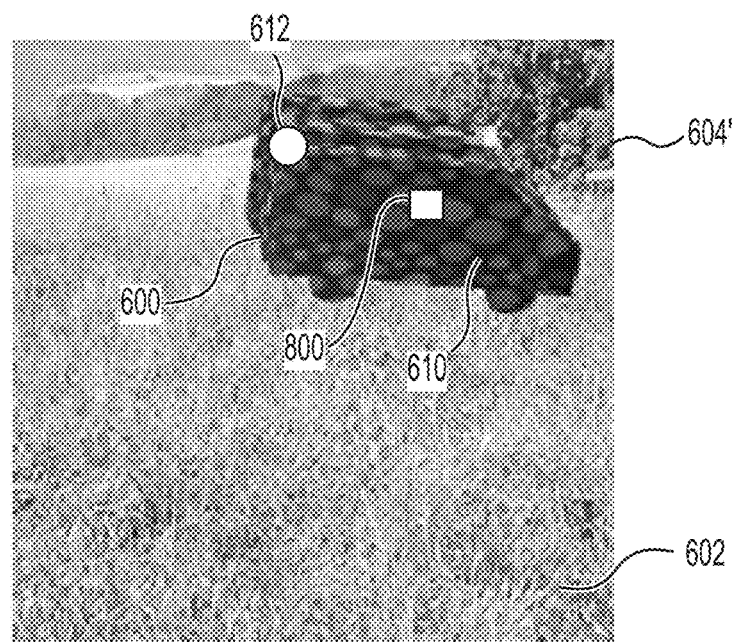
FIG. 8B

DOMAIN ADAPTATION LOSSES

BACKGROUND

1. Technical Field

The disclosure relates generally to the field of training object detection algorithms, and more specifically to methods and systems for training object detection algorithms using synthetic two-dimensional (2D) images.

2. Related Art

Estimation of 6DoF (six degrees of freedom), or 3D (three-dimensional), poses of 3D objects from RGB (Red, Green, Blue) or RGB-D (RGB-depth) images is a key element in robot manipulations, bin-picking, augmented reality applications, and various other challenging scenarios.

SUMMARY

In pose estimation, domain adaptation from synthetic to real and RGB to RGB-D (for better performance) may be a bottleneck. However, to the best of inventors' knowledge, no successful methods have been proposed in the literature to use texture-less CAD models in training, and only RGB modality while testing. In other words, successful domain adaptation from synthetic depth information to RGB has been poorly addressed, or addressed with large pre-trained networks with larger training datasets to generate a transfer function between these domains.

An advantage of some aspects of the disclosure is to solve at least a part of the problems described above, and aspects of the disclosure can be implemented as the following aspects.

One aspect of the disclosure is a non-transitory computer readable medium that embodies instructions that cause one or more processors to perform a method. The method includes: (a) selecting a 3D model corresponding to an object; (b) generating a first 2D image of the 3D model in a first pose; (c) generating a second 2D image of the 3D model in the first pose, the second 2D image having a different texture on the 3D model than the first 2D image; (d) using an algorithm, determining a first location of a first feature on the 3D model in the first 2D image and a second location of a second feature on the 3D model in the second 2D image; (e) calculating a difference based on the first location and the second location; (f) adjusting parameters representing the algorithm based on the calculated difference; (g) iterating steps (d) to (f) at least twice; and (j) storing, in a memory, parameters representing the algorithm, the parameters causing the difference in (e) to be the lowest among the iteration or lower than or equal to a threshold.

A further aspect of this disclosure is a non-transitory computer readable medium that embodies instructions that cause one or more processors to perform a method. The method includes: (a) selecting a 3D model corresponding to an object; (b) generating a first 2D image of the 3D model superimposed on a first background image in a first pose, with a centroid of the 3D model being located at a first position relative to the first background image; (c) generating a second 2D image of the 3D model superimposed on the first background image, with the centroid of the 3D model being located at the first position relative to the first background image, the 3D model having a second pose in the second 2D image different from the first pose; (d) using an algorithm, determining a first location of a keypoint on the 3D model in the first 2D image and a second location of the keypoint on the 3D model in the second 2D image; (e) calculating a difference between the first location and the second location; (f) adjusting the algorithm based on the calculated difference; (g) iterating steps (d) to (f) at least twice; and (h) storing, in a memory, parameters representing the algorithm, the parameters causing the difference in (e) to be the highest among the iteration or higher than or equal to a threshold.

In some embodiments, in the second 2D image, the 3D model is textureless. In some embodiments, the 3D model has a first texture in the first 2D image and a second texture different from the first texture in the second 2D image. In some embodiments, classification information for each of the first 2D image and second 2D image is included in the algorithm. In some embodiments, a background in the first 2D image and the second 2D image is selected to blend with the second texture.

In some embodiments, the method further includes: (i) inserting a first background image into the first and second 2D images; (j) generating third and fourth 2D images corresponding to the first and second 2D images, but with a second background image different from the first background image; and (k) performing steps (d) through (h) using the first and second 2D images and separately the third and fourth 2D images.

In some embodiments, the method further includes: (i) determining that the first background image blends with the second texture to a higher degree than the second background image; and (j) performing the adjustment in step (f) to a greater degree for the first and second 2D images than for the third and fourth 2D images.

In some embodiments, in steps (d) and (e), multiple keypoints as the feature are used, and the calculated difference is based on an aggregation of the multiple keypoints. In some embodiments, the aggregation of the multiple keypoints is a mean squared Euclidean distance of the multiple keypoints. In some embodiments, the calculation in step (e) is a loss function.

In some embodiments, the 3D model is textureless in the first 2D image and the second 2D image. In some embodiments, the 3D model has a same texture in both the first 2D image and the second 2D image. In some embodiments, the second pose is the first pose flipped 180° in one direction.

In some embodiments, the method further includes: (i2) when the calculated difference is lower in the second iteration, undoing the adjustments to the algorithm made in step (f).

In another embodiment, a non-transitory computer readable medium storing instructions to cause one or more processors to train an object detection model with a training dataset so as to derive, by regression, a pose of an object from an image of a 3D model corresponding to the object, the training dataset containing image sets of the 3D model at respective poses, each image set including at least one first image of the 3D model at a pose with texture and a second image of the 3D model at the pose without texture.

The skilled person will appreciate that except where mutually exclusive, a feature described in relation to anyone of the above embodiments may be applied mutatis mutandis to any other embodiment.

BRIEF DESCRIPTION OF THE DRAWINGS

The disclosure will be described with reference to the accompanying drawings, wherein like numbers reference like elements.

FIG. 7B is a flow diagram of an example method of performing step S416 of FIG. 4.

FIG. 8A is a first 2D image generated in a method according to FIG. 7A.

FIG. 8B is a second 2D image generated in a method according to FIG. 7A.

DESCRIPTION OF EXEMPLARY EMBODIMENTS

The disclosure relates generally to training object detection algorithms, and more specifically to methods and systems for training object detection algorithms using synthetic two-dimensional (2D) images.

In some embodiments, the trained object detection algorithm is used by an object detection device, such as an AR device. Some example systems include and/or interface with an AR device. In still other embodiments, the methods described herein for training an object detection algorithm are performed by the AR device itself.

The AR device may be, for example, an HMD. An example HMD suitable for use with the methods and systems described herein will be described with reference to FIGS. 1 and 2.

Figure 1:
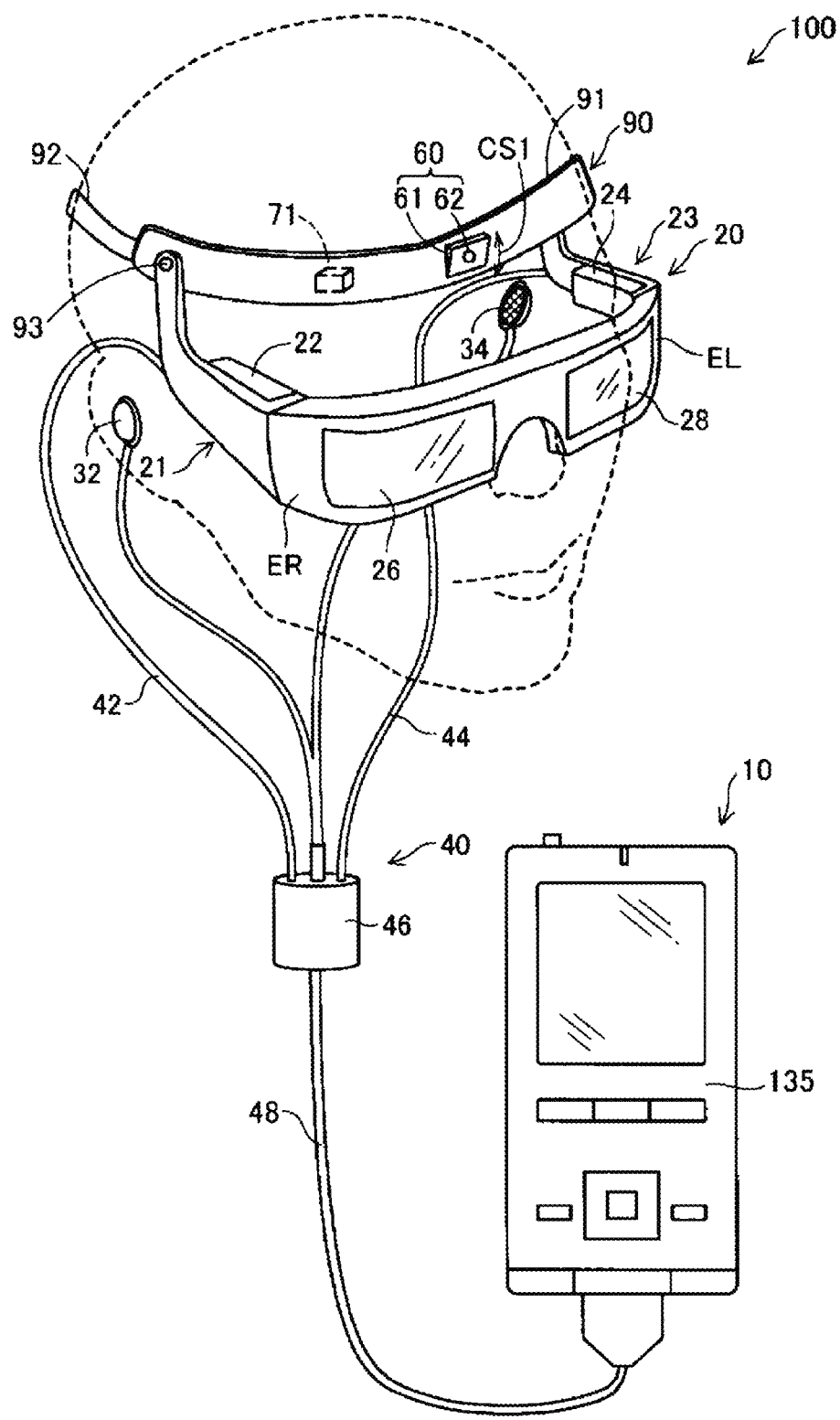
FIG. 1 is a diagram illustrating a schematic configuration of an example HMD.

FIG. 1 is a schematic configuration of an HMD 100. The HMD 100 is a head-mounted display device (a head mounted display). The HMD 100 is an optical transmission type. That is, the HMD 100 can cause a user to sense a virtual image and, at the same time, cause the user to directly visually recognize an outside scene.

The HMD 100 includes a wearing belt 90 wearable on the head of the user, a display section 20 that displays an image, and a control section 10 that controls the display section 20. The display section 20 causes the user to sense a virtual image in a state in which the display section 20 is worn on the head of the user. The display section 20 causing the user to sense the virtual image is referred to as "display AR" as well. The virtual image sensed by the user is referred to as AR image as well.

The wearing belt 90 includes a wearing base section 91 made of resin, a belt 92 made of cloth coupled to the wearing base section 91, a camera 60, and an IMU (Inertial Measurement Unit) 71. The wearing base section 91 has a shape curved along the form of the frontal region of a person's forehead. The belt 92 is worn around the head of the user.

The camera 60 functions as an imaging section. The camera 60 is capable of imaging an outside scene and disposed in a center portion of the wearing base section 91. In other words, the camera 60 is disposed in a position corresponding to the center of the forehead of the user in a state in which the wearing belt 90 is worn on the head of the user. Therefore, the camera 60 images an outside scene, which is a real scene on the outside in a line of sight direction of the user, and acquires a captured image, which is an image captured by the camera 60, in the state in which the user wears the wearing belt 90 on the head.

The camera 60 includes a camera base section 61 that rotates with respect to the wearing base section 91 and a lens section 62, a relative position of which is fixed with respect to the camera base section 61. The camera base section 61 is disposed to be capable of rotating along an arrow CS1, which indicates a predetermined range of an axis included in a plane including the center axis of the user, when the wearing belt 90 is worn on the head of the user. Therefore, the direction of the optical axis of the lens section 62, which is the optical axis of the camera 60, can be changed in the range of the arrow CS1. The lens section 62 images a range that changes according to zooming centering on the optical axis.

The IMU 71 is an inertial sensor that detects acceleration. The IMU 71 can detect angular velocity and terrestrial magnetism in addition to the acceleration. The IMU 71 is incorporated in the wearing base section 91. Therefore, the IMU 71 detects acceleration, angular velocity, and terrestrial magnetism of the wearing belt 90 and the camera base section 61.

A relative position of the IMU 71 to the wearing base section 91 is fixed. Therefore, the camera 60 is movable with respect to the IMU 71. Further, a relative position of the display section 20 to the wearing base section 91 is fixed. Therefore, a relative position of the camera 60 to the display section 20 is movable.

The display section 20 is coupled to the wearing base section 91 of the wearing belt 90. The display section 20 is an eyeglass type. The display section 20 includes a right holding section 21, a right display driving section 22, a left holding section 23, a left display driving section 24, a right optical-image display section 26, and a left optical-image display section 28.

The right optical-image display section 26 and the left optical-image display section 28 are located in front of the right eye and the left eye of the user when the user wears the display section 20. One end of the right optical-image display section 26 and one end of the left optical-image display section 28 are connected to each other in a position corresponding to the middle of the forehead of the user when the user wears the display section 20.

The right holding section 21 has a shape extending in a substantial horizontal direction from an end portion ER, which is the other end of the right optical-image display section 26, and inclining obliquely upward halfway. The right holding section 21 connects the end portion ER and a coupling section 93 on the right side of the wearing base section 91.

Similarly, the left holding section 23 has a shape extending in a substantial horizontal direction from an end portion EL, which is the other end of the left optical-image display section 28 and inclining obliquely upward halfway. The left holding section 23 connects the end portion EL and a coupling section (not shown in the figure) on the left side of the wearing base section 91.

The right holding section 21 and the left holding section 23 are coupled to the wearing base section 91 by left and right coupling sections 93 to locate the right optical-image display section 26 and the left optical-image display section 28 in front of the eyes of the user. Note that the coupling sections 93 couple the right holding section 21 and the left holding section 23 to be capable of rotating and capable of being fixed in any rotating positions. As a result, the display section 20 is provided to be capable of rotating with respect to the wearing base section 91.

The right holding section 21 is a member provided to extend from the end portion ER, which is the other end of the right optical-image display section 26, to a position corresponding to the temporal region of the user when the user wears the display section 20.

Similarly, the left holding section 23 is a member provided to extend from the end portion EL, which is the other end of the left optical-image display section 28 to a position corresponding to the temporal region of the user when the user wears the display section 20. The right display driving section 22 and the left display driving section 24 are disposed on a side opposed to the head of the user when the user wears the display section 20.

The display driving sections 22 and 24 include liquid crystal displays 241 and 242 (hereinafter referred to as "LCDs 241 and 242" as well) and projection optical systems 251 and 252 explained below. The configuration of the display driving sections 22 and 24 is explained in detail below.

The optical-image display sections 26 and 28 include light guide plates 261 and 262 and dimming plates explained below. The light guide plates 261 and 262 are formed of a light transmissive resin material or the like and guide image lights output from the display driving sections 22 and 24 to the eyes of the user.

The dimming plates are thin plate-like optical elements and are disposed to cover the front side of the display section 20 on the opposite side of the side of the eyes of the user. By adjusting the light transmittance of the dimming plates, it is possible to adjust an external light amount entering the eyes of the user and adjust visibility of a virtual image.

The display section 20 further includes a connecting section 40 for connecting the display section 20 to the control section 10. The connecting section 40 includes a main body cord 48 connected to the control section 10, a right cord 42, a left cord 44, and a coupling member 46.

The right cord 42 and the left cord 44 are two cords branching from the main body cord 48. The display section 20 and the control section 10 execute transmission of various signals via the connecting section 40. As the right cord 42, the left cord 44, and the main body cord 48, for example, a metal cable or an optical fiber can be adopted.

The control section 10 is a device for controlling the HMD 100. The control section 10 includes an operation section 135 including an electrostatic track pad and a plurality of buttons that can be pressed. The operation section 135 is disposed on the surface of the control section 10.

Figure 2:
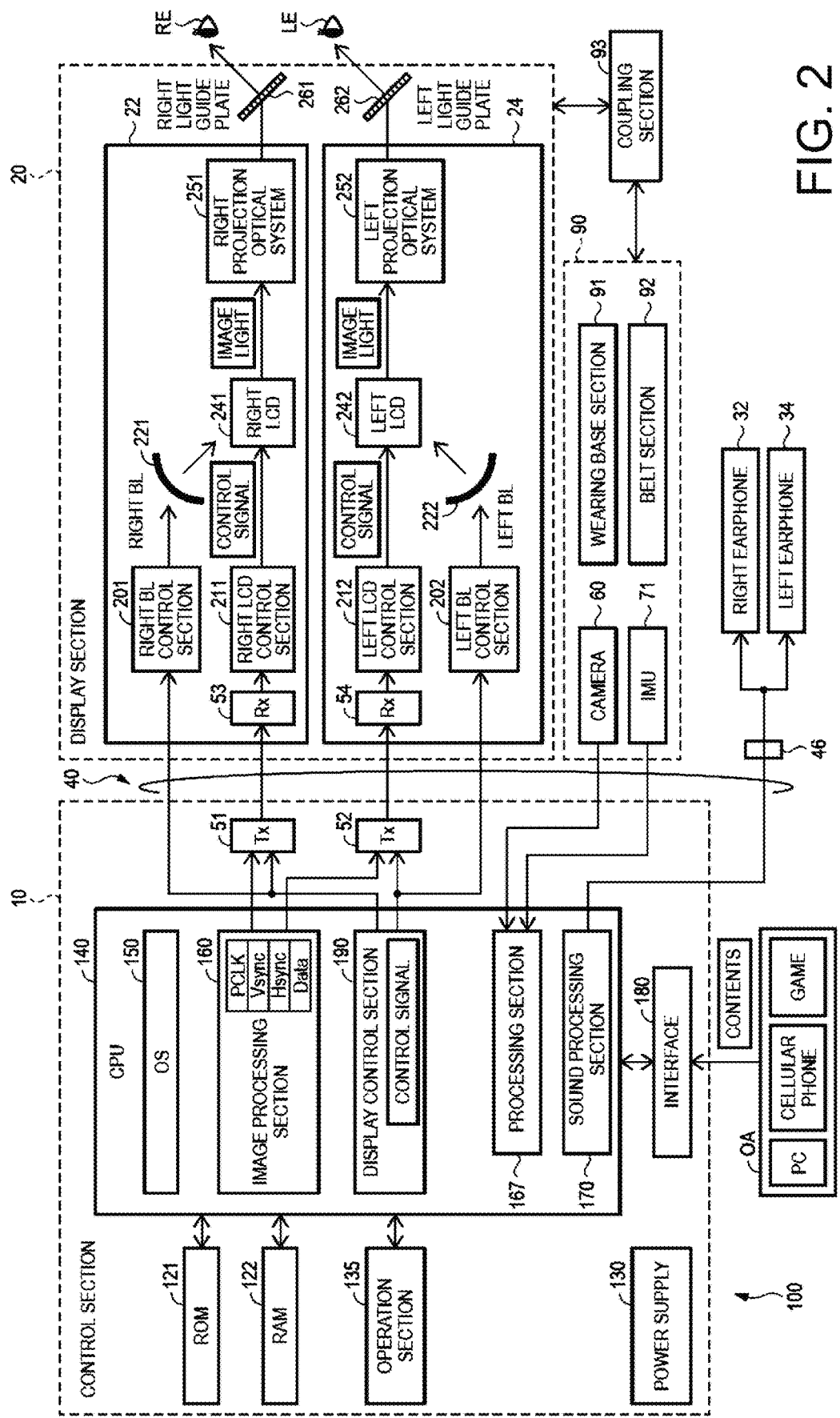
FIG. 2 is a block diagram illustrating a functional configuration of the HMD shown in FIG. 1.

FIG. 2 is a block diagram functionally showing the configuration of the HMD 100. As shown in FIG. 2, the control section 10 includes a ROM 121, a RAM 122, a power supply 130, the operation section 135, a CPU 140 (sometimes also referred to herein as processor 140), an interface 180, and a transmitting section 51 (Tx 51) and a transmitting section 52 (Tx 52).

The power supply 130 supplies electric power to the sections of the HMD 100. Various computer programs are stored in the ROM 121. The CPU 140 develops or loads, in the RAM 122, the computer programs stored in the ROM 121 to execute the computer programs. The computer programs include computer programs for realizing tracking processing and AR display processing explained below.

The CPU 140 develops, in the RAM 122, the computer programs stored in the ROM 121 to function as an operating system 150 (OS 150), a display control section 190, a sound processing section 170, an image processing section 160, and a processing section 167.

The display control section 190 generates control signals for controlling the right display driving section 22 and the left display driving section 24. The display control section 190 controls generation and emission of image lights respectively by the right display driving section 22 and the left display driving section 24.

The display control section 190 transmits control signals to a right LCD control section 211 and a left LCD control section 212 respectively via the transmitting sections 51 and 52. The display control section 190 transmits control signals respectively to a right backlight control section 201 and a left backlight control section 202.

The image processing section 160 acquires an image signal included in contents and transmits the acquired image signal to receiving sections 53 and 54 of the display section via the transmitting sections 51 and 52. The sound processing section 170 acquires a sound signal included in the contents, amplifies the acquired sound signal, and supplies the sound signal to a speaker (not shown in the figure) in a right earphone 32 and a speaker (not shown in the figure) in a left earphone 34 connected to the coupling member 46.

The processing section 167 acquires a captured image from the camera 60 in association with time. The time in this embodiment may or may not be based on a standard time. The processing section 167 calculates a pose of an object (a real object) according to, for example, a transformation matrix. The pose of the object means a spatial relation (a rotational and a translational relation) between the camera 60 and the object. The processing section 167 calculates, using the calculated spatial relation and detection values of acceleration and the like detected by the IMU 71, a transformation matrix for converting a coordinate system fixed to the camera 60 to a coordinate system fixed to the IMU 71. The function of the processing section 167 is used for the tracking processing and the AR display processing explained below.

The interface 180 is an input/output interface for connecting various external devices OA, which are supply sources of contents, to the control section 10. Examples of the external devices OA include a storage device having stored therein an AR scenario, a personal computer (Pc), a cellular phone terminal, and a game terminal. As the interface 180, for example, a USB interface, a micro USB interface, and an interface for a memory card can be used.

The display section 20 includes the right display driving section 22, the left display driving section 24, the right light guide plate 261 functioning as the right optical-image display section 26, and the left light guide plate 262 functioning as the left optical-image display section 28. The right and left light guide plates 261 and 262 are optical see-through elements that transmit light from real scene.

The right display driving section 22 includes the receiving section 53 (Rx53), the right backlight control section 201 and a right backlight 221, the right LCD control section 211 and the right LCD 241, and the right projection optical system 251. The right backlight control section 201 and the right backlight 221 function as a light source.

The right LCD control section 211 and the right LCD 241 function as a display element. The display elements and the optical see-through elements described above allow the user to visually perceive an AR image that is displayed by the display elements to be superimposed on the real scene. Note that, in other embodiments, instead of the configuration explained above, the right display driving section 22 may include a self-emitting display element such as an organic EL display element or may include a scan-type display element that scans a light beam from a laser diode on a retina. The same applies to the left display driving section 24.

The receiving section 53 functions as a receiver for serial transmission between the control section 10 and the display section 20. The right backlight control section 201 drives the right backlight 221 on the basis of an input control signal. The right backlight 221 is a light emitting body such as an LED or an electroluminescence (EL) element. The right LCD control section 211 drives the right LCD 241 on the basis of control signals transmitted from the image processing section 160 and the display control section 190. The right LCD 241 is a transmission-type liquid crystal panel on which a plurality of pixels is arranged in a matrix shape.

The right projection optical system 251 is configured by a collimate lens that converts image light emitted from the right LCD 241 into light beams in a parallel state. The right light guide plate 261 functioning as the right optical-image display section 26 guides the image light output from the right projection optical system 251 to the right eye RE of the user while reflecting the image light along a predetermined optical path. Note that the left display driving section 24 has a configuration same as the configuration of the right display driving section 22 and corresponds to the left eye LE of the user. Therefore, explanation of the left display driving section 24 is omitted.

The device to which the technology disclosed as an embodiment is applied may be an imaging device other than an HMD. For example, the device may be an imaging device that has no function of displaying an image.

Figure 3:
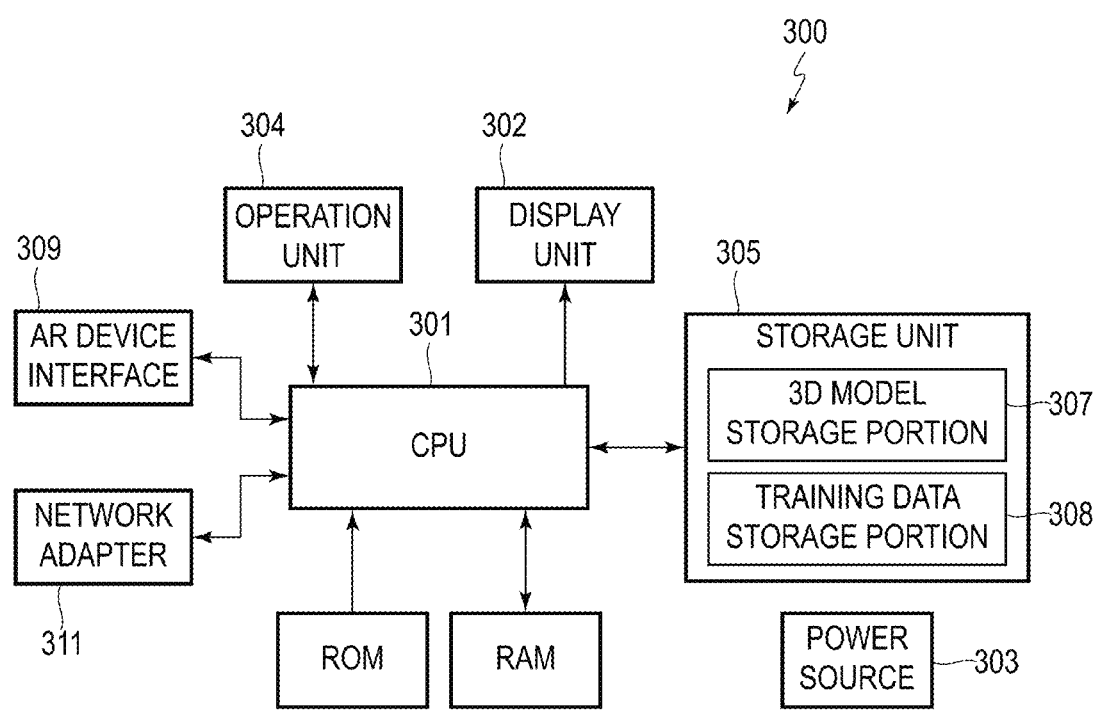
FIG. 3 is a block diagram illustrating a functional configuration of a computer for performing the methods of this disclosure.

FIG. 3 is a block diagram illustrating a functional configuration of a computer 300 as an information processing device in the present embodiment which performs the methods described herein. The computer 300 includes a CPU 301, a display unit 302, a power source 303, an operation unit 304, a storage unit 305, a ROM, a RAM, an AR interface 309 and a network adaptor 310. The power source 303 supplies power to each unit of the computer 300. The operation unit 304 is a user interface (GUI) for receiving an operation from a user. The operation unit 304 includes a keyboard, a mouse and a touch pad and the like and their driver software.

The storage unit 305 stores various items of data and computer programs, and includes a hard disk drive, a solid-state drive, or the like. The storage unit 305 includes a 3D model storage portion 307 and a template storage portion 308. The 3D model storage portion 307 stores a three-dimensional model of a target object, created by using computer-aided design (CAD) or other 3D reconstruction methods. The training data storage portion 308 stores training data created as described herein (not shown). The storage unit 305 also stores instructions (not shown) for execution by the CPU 301. The instructions cause the CPU 301 to perform the methods described herein. The AR interface 309 is an interface for communicative connection to an AR device. The AR interface may be any wired or wireless interface suitable for establishing a data connection for communication between the computer 300 and an AR device. The AR interface may be, for example, a Wi-Fi transceiver, a USB port, a Bluetooth® transceiver, a serial communication port, a proprietary communication port, or the like. The network adaptor 310 is configured to allow CPU 301 to connect to one or more networks to communicate with other computers, such as a server computer via a wireless network, so that, for example, the computer 300 receives from the other computer a computer program that causes the computer 300 to perform functions described in the embodiments described herein. In some embodiments, the AR device interface 309 and the network adaptor 310 are a single adaptor suitable for performing the tasks of both network adaptor 310 and AR device interface 309.

By way of AR device interface 309, the CPU 301 communicates with camera 60 (shown in FIGS. 1 and 2). The camera 60 is an RGB image sensor and/or an RGBD sensor and used when the CPU 301 acquires an image including a 2.5D image or a video/2.5D video sequence of a real object. The network adapter 311 is configured to allow CPU 301 to communicate with another computer such as a server computer via a wireless network, so that, for example, the computer 300 receives from the other computer a program that causes the computer 300 to perform functions described in this embodiment.

The CPU 301 reads various programs (also sometimes referred to herein as instructions) from the ROM and/or the storage unit 305 and develops the programs in the RAM, so as to execute the various programs. Suitable instructions are stored in storage unit 305 and/or the ROM and executed by the CPU 301 to cause the computer 300 to operate as a training computer to train the object detection algorithm as described herein. In some embodiments, the computer 300, with the appropriate programming, is a system for training an object detection algorithm using synthetic images. In other embodiments, the HMD 100 is the system for training an object detection algorithm using synthetic images. In still other embodiments, the system for training an object detection algorithm using synthetic images includes the computer 300 and the HMD 100.

The embodiments described herein relate to methods and systems for training an object detection algorithm using synthetic images, rather than actual images of a real-world object. As used herein, synthetic images generally refer to 2D images that are not created using a camera to capture a representation of a 3D scene. More specifically, with respect to training an object detection algorithm to detect a representation of a real-world 3D object in image frames captured by a camera, synthetic images are 2D images that are not created by a camera capturing a representation of the real-world 3D object. Synthetic images may be generated by capturing 2D images of a 3D model of an object in a computer (e.g., a 3D CAD model of an object), drawing (whether by hand or using a computer) a 2D image of the object, or the like. It should be noted that synthetic images include images of a synthetic image. For example, a photograph or scan of a synthetic image may itself be a synthetic image, in one embodiment. Conversely, images of an actual image, such as a photograph or scan of a photograph of the real-world 3D image, may not be synthetic images for purposes of this disclosure under one embodiment.

The 3D model or CAD model may be a category model of the object. For example, if the object is a specific car or cars generally, a generic car model can be used as the 3D model or CAD model. This 3D model or CAD model will have a shape approximating most cars. Embodiments of the detection algorithm herein can detect real-world objects within a generic category using such a category model.

Figure 4:
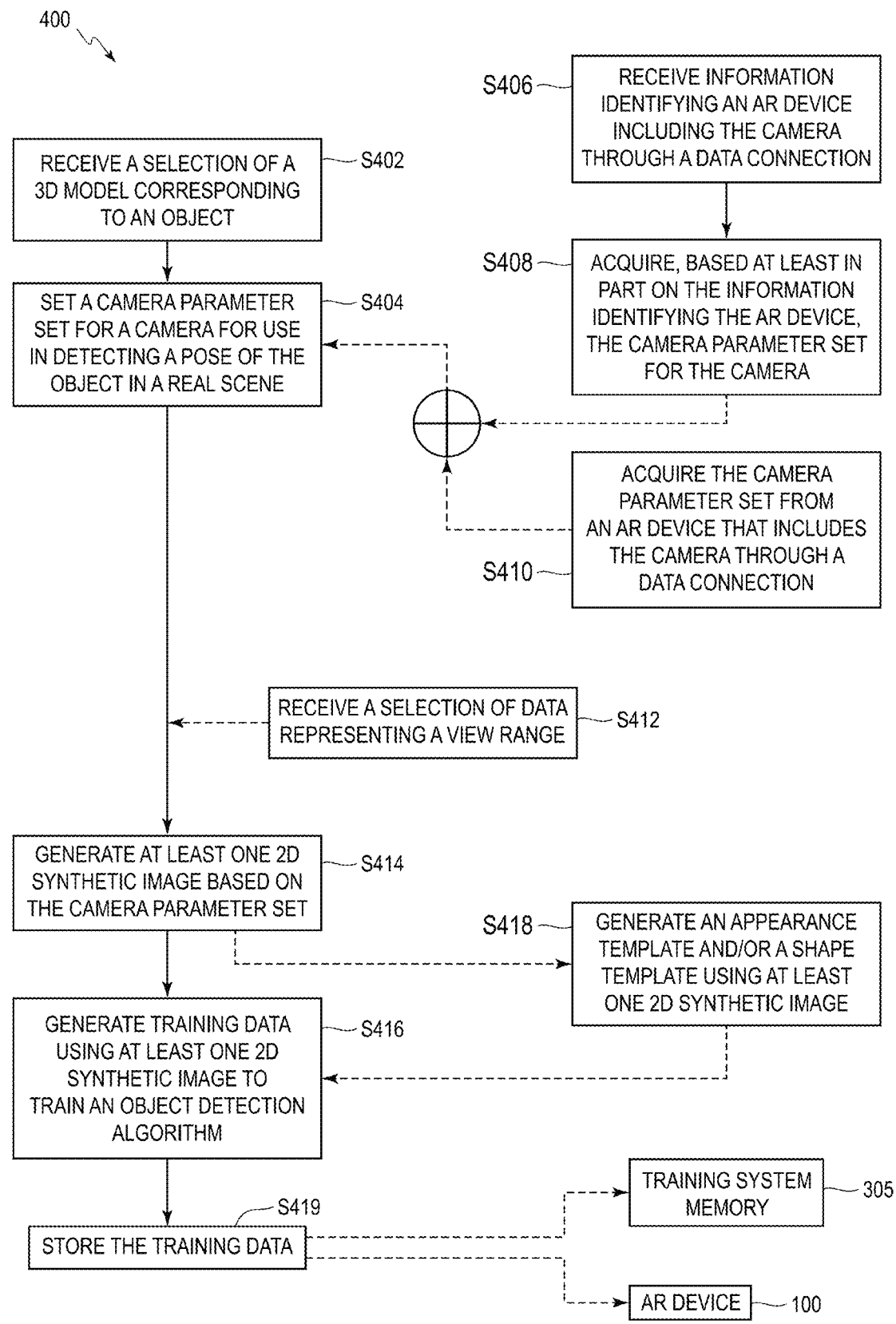
FIG. 4 is a flow diagram of an example method according to this disclosure.

FIG. 4 is a flow diagram of an example method 400 of training an object detection algorithm using synthetic images. The method 400 may be performed by computer 300 to train an object detection algorithm for use with the HMD 100 and will be described with reference to computer 300 and HMD 100. In other embodiments, the method 400 may be performed by a different computer (including, e.g., the control section 10), may be used to train an object detection algorithm for a different AR device, may be used to, and/or may be used to train an object detection algorithm for any other device that performs object detection based on image frames. To facilitate performance by a computer, the method 400 is embodied as instructions executable by one or more processors and stored in a non-transitory computer readable medium.

Initially, in S402, CPU 301 receives a selection of a 3D model stored in one or more memories, such as the ROM or the storage unit 305. The 3D model may correspond to a real-world object (or a category to which the real-world object belongs) that the object detection algorithm is to be trained to detect in 2D image frames. In the example embodiment, the selection is received from a user, such as by a user selection through a GUI of the computer 300.

It is noted that a 3D model is discussed herein as being used to generate synthetic images in method 400. However, in some embodiments, a 3D model may not be required and instead, electronic data other than a 3D model (e.g., a 2D model, one or more 2D or 3D synthetic images, or the like) may be used in step S402. As such, for ease of description, the steps of method 400 (and other parts of the present disclosure) are described using a 3D model. However, the present disclosure is not limited to using a 3D model under step S402 and anywhere where a 3D model is referenced, it should be understood that some embodiments may relate to using electronic data other than a 3D model.

A camera parameter set for a camera, such as the camera 60, for use in detecting a pose of the object in a real scene is set in S404. The images captured by different cameras of the same real scene will typically differ at least somewhat based on the particular construction and components of each camera. The camera parameter set defines, at least in part, how its associated camera will capture an image. In the example embodiment, the camera parameter set may include the resolution of the images to be captured by the camera and camera intrinsic properties (or "camera intrinsics"), such as the X and Y direction focal lengths (fx and fy, respectively), and the camera principal points coordinates (cx and cy). Other embodiments may use additional or alternative parameters for the camera parameter set. In some embodiments, the camera parameter set is set by the user, such as by a user selection through a graphical user interface ("GUI") of the computer 300.

In some embodiments, the camera parameter set is set by the computer 300 without being selected by the user. In some embodiments, a default camera parameter set is set by the computer 300. The default camera parameter set may be used when the camera that will be used in detecting the pose of the object in the real scene is unknown or its parameters are unknown. The default camera set may include the parameters for an ideal camera, a popular camera, a last camera for which a camera parameter set was selected, or any other suitable camera parameter set. Moreover, some embodiments provide a combination of one or more of the above-described methods of setting the camera parameter set.

According to various embodiments, the camera parameter set (S404) can be set by many different ways, including by a computer retrieving a pre-stored model from a plurality of models pre-stored on a database, the computer receiving camera parameters from a connected AR device, and/or by a user directly entering (and/or modifying) into a GUI. However, the present application should not be limited to these specific embodiments. Nonetheless, the above embodiments are described herein below.

First, in some embodiments, setting the camera parameter set (S404) is performed by receiving information identifying a known AR device including the camera (S406). The information identifying the AR device is received from a user input, such as by selecting, through the computer's GUI, the AR device from a list of known AR devices. In other embodiments, the user may input the information identifying the AR device, such as by typing in a model name, model number, serial number, or the like.

The CPU 301 acquires, based at least in part on the information identifying the AR device, the camera parameter set for the camera (S408). The camera parameter set may be acquired from a plurality of the camera parameter sets stored in one or more memories, such as the storage unit 305 or a local or remote database. Each camera parameter set is associated in the one or more memories with at least one AR device of a plurality of different AR devices. Because multiple different AR devices may include the same camera, a single camera parameter set may be associated with multiple AR devices.

In some embodiments, setting the camera parameter in S404 includes acquiring the camera parameter set from AR device that includes the camera through a data connection when the AR device becomes accessible by the one or more processors (S410). For example, when the HMD 100 is connected (wired or wirelessly) to the AR device interface 309 of the computer 300, the CPU 301 may retrieve the camera parameter set from HMD 100 (stored, for example, in the ROM 121). In other embodiments, the computer 300 may acquire the camera parameter set from the AR device by determining the camera parameter set. For example, the computer 300 may cause the camera 60 in the HMD 100 to capture one or more image frames of, for example, a calibration sheet and the computer 300 may analyze the resulting image frame (s) to determine the camera parameter set. In still other embodiments, the computer 300 may retrieve from the AR device an identification of the AR device and/or the camera in the AR device and retrieve the appropriate camera parameter set from the one or more memories based on the retrieved identification. As mentioned above, the various techniques may be combined. For example, in some embodiments, if the AR device is available to the computer (e.g., it is connected to AR device interface 309), the camera parameter set is acquired from the camera, and if the AR device is not available to the computer the setting of S406 and S408 is performed.

Once the camera parameter set is set, the CPU 301 generates at least one 2D synthetic image based on the camera parameter set by rendering the 3D model in a view range (S414). The view range is the range of potential locations of the camera 60 around the stationary object for which images will be synthesized. In the example embodiment, the view range includes an azimuth component and an elevation component. The view range may also include a distance component that sets a distance of the potential locations in the view range from the 3D model of the object. The view range generally defines an area on the surface of a sphere having a radius equal to the length of the distance component. Each view point within the view range for which a synthetic image is generated represents a different pose of the object.

In some embodiments, the CPU 301 receives selection of data representing the view range (S412) before generating the at least one 2D synthetic image. The selection may be received, for example, from a user selection via a GUI. In some embodiments, the GUI includes a preview view of the object and a graphical representation of the user selected view range. In some embodiments, the view range is a single pose of the object selected by the user. In other embodiments, the view range is a predetermined (e.g., a default) view range. Instill other embodiments, the CPU 301 utilizes the predetermined view range unless the user provides a different selection of the view range (or modification of the predetermined view range. In some embodiments the predetermined view range is less than 360 degrees around the object in one or more of the azimuth or elevation.

The CPU 301 generates at least one 2D synthetic image of the 3D model representing the view of the 3D model from a location within the view range. The number of 2D synthetic images to be generated may be fixed, variable, or user selectable. Any suitable number of images may be generated as long as at least one 2D synthetic image is generated. If a single 2D synthetic image is generated, the image is generated for a central point within the view range. If more than one image is generated, the images are generated relatively evenly throughout the view range. In some embodiments, if the number of views is fixed or set by the user, the computer 300 determines how far apart within the view range to separate each image to achieve some distribution of images within the view range such as an even distribution (e.g., so that each image is a view from a same distance away from the view of each adjacent image). In other embodiments, the computer 300 generates a variable number of images, based on the size of the view range and a fixed interval for the images. For example, the computer may generate an image from a viewpoint every degree, every five degrees, every ten degrees, every twenty degrees in azimuth and elevation within the view range. The intervals above are examples and any other suitable interval, including less than a full degree interval, may be used. The interval between images does not need to be the same for azimuth and elevation.

The computer 300 generates the at least one 2D synthetic image based on the camera parameter set that was set in S404. The camera parameter set alters the rendering of the 3D object for the view point of the image to replicate a real image of the real-world object taken from the same viewpoint. In this embodiment, a process of generating synthetic images uses a rigid body transformation matrix for transforming 3D coordinate values of 3D points represented in the 3D model coordinate system to ones represented in an imaginary camera coordinate system, and a perspective projection transformation matrix for projecting the transformed 3D coordinate values to 2D coordinate values on the virtual plane of the synthetic images. The rigid body transformation matrix corresponds to a viewpoint, or simply a view, and is expressed by a rotation matrix representing rotations around three axes which are orthogonal to each other, and a translation vector representing translations along the three axes. The perspective projection transformation matrix includes camera parameters, and is appropriately adjusted so that the virtual plane corresponds to an imaging surface of a camera, such as camera 60. The 3D model may be a CAD model. For each view, the computer 300 transforms and projects 3D points on the 3D model to 2D points on the virtual plane so that a synthetic image is generated, by applying rigid body transformation and perspective projection transformation to the 3D points.

In S416, the computer 300 generates training data using the at least one 2D synthetic image to train an object detection algorithm. The training data based on the synthetic image may be generated using any technique suitable for use with real images. In some embodiments, generating the training data includes generating an appearance template and/or a shape template using the 2D synthetic image (S418). The appearance template includes one or more features such as color, surface images or text, corners, and the like. The appearance template may include, for example, coordinate values of the locations of features of the object in the 2D synthetic image and their characterization, the coordinates of locations on the 3D model that correspond to those 2D locations, and the 3D model in the pose for which the 2D image was generated. The shape template describes the shape of the object in two dimensions without the surface features that are included in the appearance template. The shape template may include, for example, coordinate values of points (2D contour points) included in a contour line (hereinafter, also simply referred to as a "contour") representing an exterior of the object in the 2D synthetic image, the points on the 3D model that correspond to the 2D contour points, and the 3D model in the pose for which the 2D image was generated. In some embodiments, separate shape and appearance templates are created for each synthetic image generated for the view range. In other embodiments, data for multiple images may be stored in a single template.

The generated training data is stored in one or more memories (S419). In some embodiments, the training data is stored in the computer's training system memory 305. In some embodiments, when the HMD 100 is communicatively coupled to the computer 300 through the AR device interface 309, the training data is stored by the computer 300 in the memory (such as ROM 121) of the HMD 100. In other embodiments, the training data is stored in the computer's training system memory 305 and the HMD 100.

After the training data is stored in the HMD 100, the HMD 100 may operate to detect the object based on the training data. In some embodiments, the HMD attempts to detect the object in image frames of a real scene captured by the camera 60 by attempting to find a match between the template(s) and the image using the HMD's object detection algorithm.

In some embodiments, training data is generated for multiple cameras and/or AR devices for use in detecting a pose of the object in a real scene. In some such embodiments, setting the camera parameter set in S404 includes setting a plurality of camera parameter sets for a plurality of cameras, S414 includes generating a plurality of 2D synthetic images based at least on the plurality of camera parameter sets, and S416 includes generating training data using the plurality of 2D synthetic images to train an object detection algorithm for a plurality of AR devices having the plurality of cameras. In other embodiments, steps S404, S414, and S416 (optionally including one or more of S406, S408, S410, S412, and S418) are simply repeated multiple times, each time for a different camera.

Synthetic Training Data Generation

In particular, the methods herein can generate object recognition training data using a CAD model (i.e. 3D model) instead of RGB images of the object. The use of RGB images of the object might be difficult to implement and can lower the quality of the training data, because the RGB textures will often be different during the detection phase. Another problem in using RGB training data is that generating accurate ground-truth pose or view-range as the training label for the RGB data may be very time-consuming and may require a lot of manual effort. The below description and FIGS. 5A-8B address these and other problems according to some embodiments.

Figure 5A:
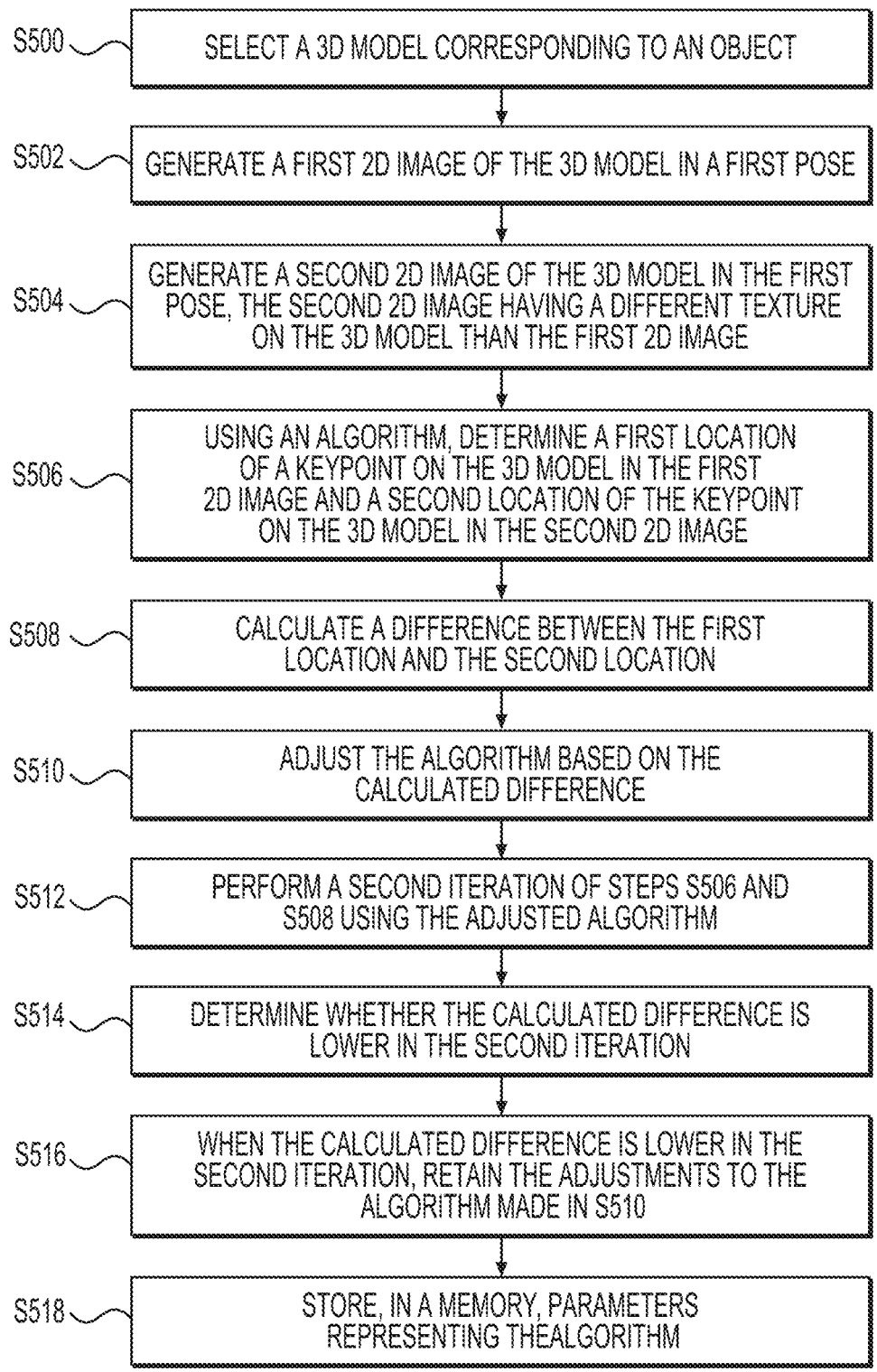
FIG. 5A is a flow diagram of an example method of performing step S416 of FIG. 4.
Figure 5B:
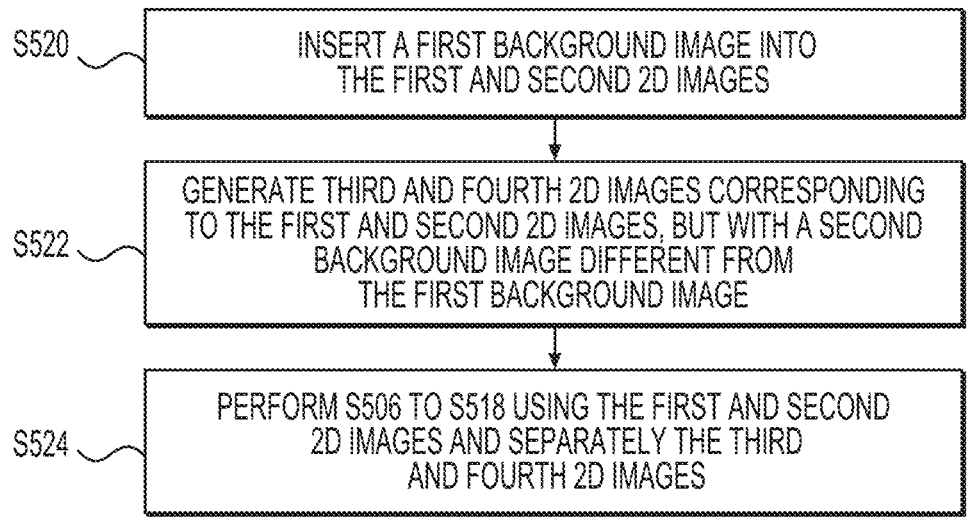
FIG. 5B is a flow diagram of an example method of performing step S416 of FIG. 4.

FIG. 5A is a flow diagram of an example method of performing step S416 of FIG. 4. According to this method, training data can be developed using the CAD model. An object detection algorithm model that is to be trained with the synthetic training data according to this example is a neural network model such as a deep learning neural network model and a CNN (convolutional neural network) model.

In step S500, the 3D model of the object is selected to generate training data. This 3D model may be a CAD model of an object that is expected to be detected in the real-world in the detection phase, or a generic category to which the object belongs. For example, this could be an interactive object for AR software, or a manufacturing part that will be viewed and worked on by a robot. In one embodiment, the synthetic training data contains domain-adapted images corresponding to, or distributed in, a 360-degree view range in azimuth around the 3D model. For example, there may be at least one domain-adapted image in each 90-degree subrange of that 360-dgree view range, or at least one domain-adapted image in each 180-degree subrange of that 360-degree range. In another embodiment, the view range may be restricted to less than 360 degrees, such as equal to or greater than 0 degree and equal to or less than 180 degrees in azimuth.

In step 502, a first 2D image of the 3D model is generated, where the first 2D image represents the 3D model in a first pose. This can be done as part of an effort to perform domain adaptation. "Domain adaptation" in the application can be defined as a state where a data distribution difference between the domains of rendered images from a 3D model and the images obtained from a camera containing the object in a real-world scene is alleviated or compensated without substantial degradation of data necessary to effectively train for object detection. Domain adaptation techniques such as the use of random or algorithmically chosen textures (e.g., noise, certain lighting conditions), and certain enhancement filters are adapted. "Algorithmically" can include "pseudo-randomly" herein. In other words, domain adaptation can be achieved by desensitizing the algorithm to texture during training, and/or using view classification, as described further below.

Same Pose Training

Figure 6A:
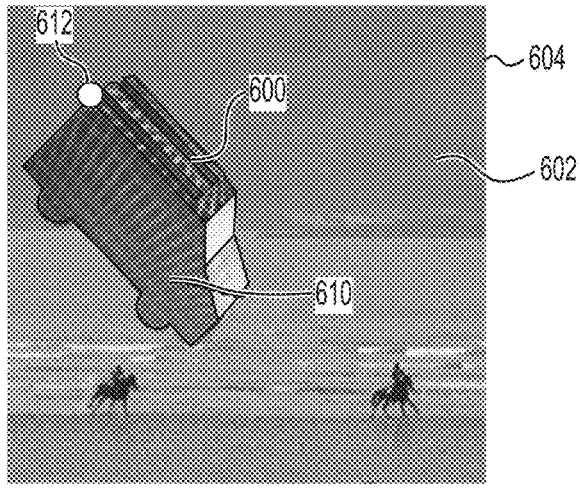
FIG. 6A is a first 2D image generated in a method according to FIG. 5A.
Figure 6B:
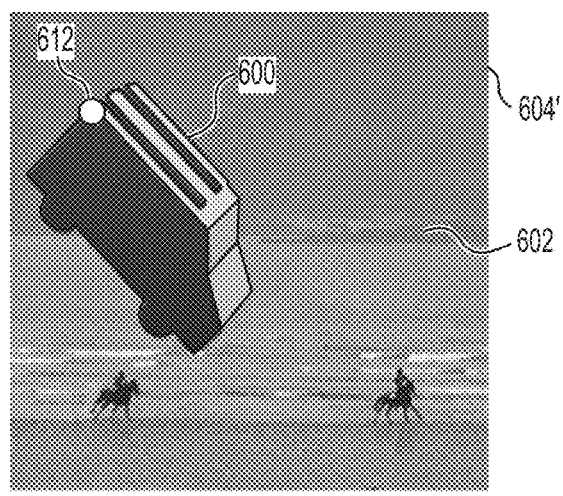
FIG. 6B is a second 2D image generated in a method according to FIG. 5A.

FIGS. 6A and 6B show techniques including the domain adaptation referred to in step S502. Specifically, first, FIG. 6A shows an example of wrapping the 3D model 600 with random texture 610 to simulate real texture information that is unknown at the time of training. A background image 602 is provided, and is either selected randomly or algorithmically. A synthetic image (2D image) 604 of the 3D model 600 at a first pose with the background image 602 is generated for training purposes.

Figure 6C:
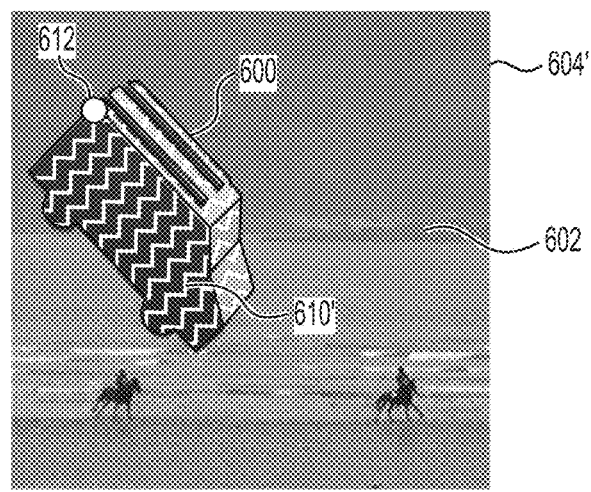
FIG. 6C is a second 2D image generated in a method according to FIG. 5A.

FIG. 6B shows a second 2D image 604' of the 3D model 600 at the same pose on the same background image 602, but with no texture provided on the 3D model 600. According to another embodiment, FIG. 6C shows a second 2D image 604' of the 3D model 600 at the same pose on the same background image 602, but with a different texture 610' from FIG. 6A provided on the 3D model 600. The training algorithm locates keypoints on the 3D model 600 in both images in FIGS. 6A and 6B (or FIGS. 6A and 6C), and compares results, as described further below. Many different synthetic images are generated using different points of view of the 3D model and different background images 602. Many different backgrounds can be used for each viewpoint to desensitize the detection algorithm to texture. The detection algorithm, which is described in detail later, may be a regression model or a network model. The training algorithm trains the parameters of the detection algorithm to have the detection algorithm extract desired features from images by using at least one loss functions described later.

Generation and comparison of the images of FIGS. 6A-6C are further described in FIGS. 5A-5D.

Referring back to FIG. 5A, in step S504, a second 2D image 604' of the 3D model is generated, which corresponds to FIG. 6B or 6C. In step S506, the algorithm locates a keypoint 612 on 3D model 600 in the first 2D image 604. In this embodiment, the keypoint 612 is located on an edge or contour of 3D model 600. Next, the same keypoint 612 is located on 3D model 600 in the second 2D image 604'. In a perfectly trained algorithm, the location of keypoint 612 would be the same in both the first 2D image 604 and the second 2D image 604'. However, because of the different textures in on 3D model 600 in the first 2D image 604, and the second 2D image 604', the algorithm will sometimes determine different locations or a different keypoint for keypoint 612. This is because the textures may muddle edges or contours of 3D model 600, or blend with the background image 602, causing the algorithm to produce an inaccurate location of keypoint 612 for one or both of the first and second 2D images 604, 604'.

The difference between the locations of keypoint 612 in 2D images 604, 604' is calculated in step S508. This difference, or error, can be incorporated in a loss function. The loss function may represent the difference between the determined locations of keypoint 612 in two different images, or the calculated difference between a known true location of keypoint 612 and its determined location in an image, or a combination of multiple of these measures. For this reason, classification information can be included for the first 2D image and the second 2D image. For example, the ground truth location of keypoint 612 could be stored in association with the images, so that the loss function can determine a true error of the detection results. This loss function can be used to improve the detection capabilities of a detection algorithm, as discussed further below. When those detection capabilities are enhanced, the algorithm is more capable of accurate computer vision in real-world applications where textures, lighting conditions, and other variables are unpredictable.

In step S510, the algorithm is adjusted based on the calculated difference (e.g. Euclidean distance or other distance measures) between the locations of keypoint 612 in 2D images 604, 604'. In other words, the loss function is used to train the detection algorithm. In some embodiments, multiple keypoints 612 are detected in first and second 2D images 604, 604'. In such embodiments, the aggregated scores such as average, mean, mean squared, or median distance between the same (paired) keypoints in different images may be used as the calculated difference. The greater the value of the loss function, the larger the calculated difference between the locations of keypoint 612. Based on this difference, the detection algorithm is changed. This change may include changes to parameters or functions in the detection algorithm. The goal of these changes is to reduce the loss function if the same keypoints 612 were detected in 2D images 604, 604' again.

In order to confirm that the changes to the detection algorithm had the desired effect, a second iteration of steps S506 and S508 is performed in step S512, using the changed algorithm. In other words, using the changed algorithm, keypoint 612 (or multiple keypoints 612) is located in a first 2D image 604 and a second 2D image 604'. Thereafter, the difference between the determined keypoint location in the first 2D image 604 and the determined keypoint location in the second 2D image 604' is calculated. The process for doing this is described above.

After the second iteration is performed in S512, it is determined whether the calculated difference is lower in the second iteration (S514). In other words, it is determined using a regression whether or not the adjustments performed in step S510 improved the detection algorithm. If the calculated difference is lower in the second iteration, then the adjustments improved the algorithm, and the adjustments are retained (S516). Otherwise, the changes may be undone, as shown in S516' of FIG. 5D. If the changes are undone, a different adjustment may be performed on the algorithm in order to reduce the loss calculated in step S508. Alternatively, the algorithm may not undo changes, but instead continue to iteratively improve the algorithm until it is determined that further improvement is not possible. This process is repeated until a minimum threshold of error is reached. For example, in deep learning, a single estimation of error in a subset of images (called a mini-batch) is "back-propagated" to change the parameters. Afterwards, the errors are re-calculated, and the back-propagations is continued, until a minimum threshold of error is reached, or the loss stops decreasing over multiple iterations (e.g. continuously increase).

In some embodiments, different background images 602 are used for multiple sets of images, in order for the algorithm to not get biased with the background information. For example, as described in FIG. 5B, a first background image 602 can be inserted into the first and second 2D images 604, 604' (S520). Thereafter, a different background image is used to generate similar third and fourth 2D images (S522). Finally, steps S506 to S518 are performed separately for the first and second 2D images, and the third and fourth 2D images. This way, the different backgrounds can be assessed for how much loss they cause the detection algorithm to generate. Backgrounds producing higher loss can be used more extensively to train the detection algorithm, in order to promote texture independence. In other embodiments, S506 and S518 are performed separately or jointly, by passing all images in a single mini-batch, and use an aggregate loss function over all. Because all images would have their respective losses, we can always know which backgrounds produced higher loss, even in the joint case.

Figure 5C:
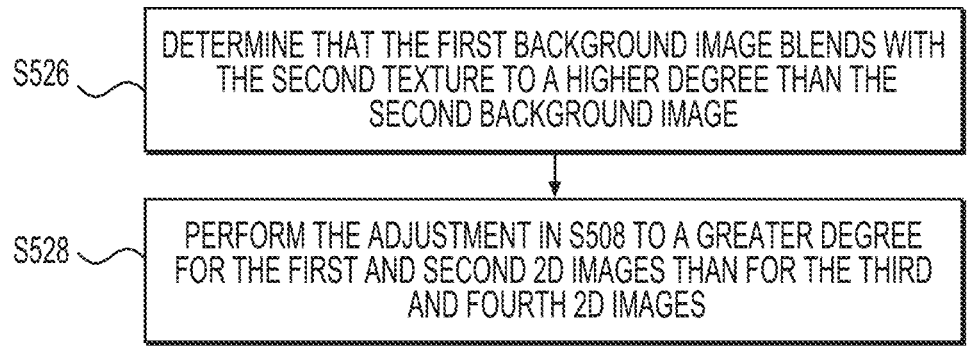
FIG. 5C is a flow diagram of an example method of performing step S416 of FIG. 4.
Figure 5D:
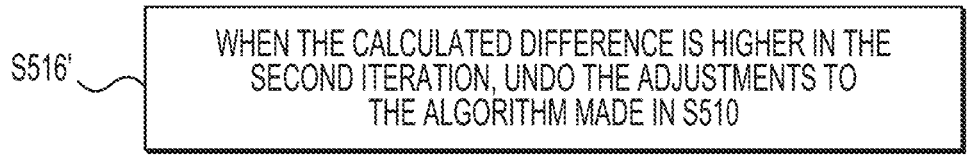
FIG. 5D is a flow diagram of an example method of performing step S416 of FIG. 4.

For example, the background image 602 can be selected to blend with the texture 610, 610' overlaid on the 3D model 600, as described in step S526 in FIG. 5C. This blending can be characterized by assigning a clutter constant. 2D images 604, 604' featuring a high clutter constant can be used more extensively in training the detection algorithm, in order to desensitize the detection algorithm to background and object textures, as described in step S528 in FIG. 5C.

By desensitizing the algorithm to texture, it is better able to detect the object based on its shape in a variety of real-world environments and conditions. This results in improved performance, particularly in situations where the object has different texture from RGB sample images, or is in a very different background. It also works well for recognizing objects that have permutations, or variations in texture and/or shape, from the 3D model used for training.

Different Pose Training

Training the detection algorithm using a different pose is similar to the training methods described above, except as noted below. An example of this method is shown in FIGS. 8A and 8B, which show the first 2D image 604 and second 2D image 604' according to this embodiment. In this embodiment, the 3D model 600 has the same texture 610. In another embodiment, the 3D model 600 is textureless in both 2D images. A centroid of the 3D model 800 is located in the same location in the drawing relative to background 602 (which is also the same in both images). However, the pose of the 3D model is flipped about the centroid 800 by 180 degrees. Other permutations of the pose between first 2D image 604 and second 2D image 604' are also possible.

In this embodiment, it is expected that the detection algorithm will detect very different poses (i.e. keypoint 612 locations) for the first 2D image 604 and the second 2D image 604'. However, if the algorithm is not well trained, it may produce similar pose results based on the same texture being overlaid on the 3D model 600 in both images. Thus, it is a goal to train the algorithm to ignore the identical textures and produce different keypoint locations corresponding to the different poses, only based on the shape variation.

Figure 7A:
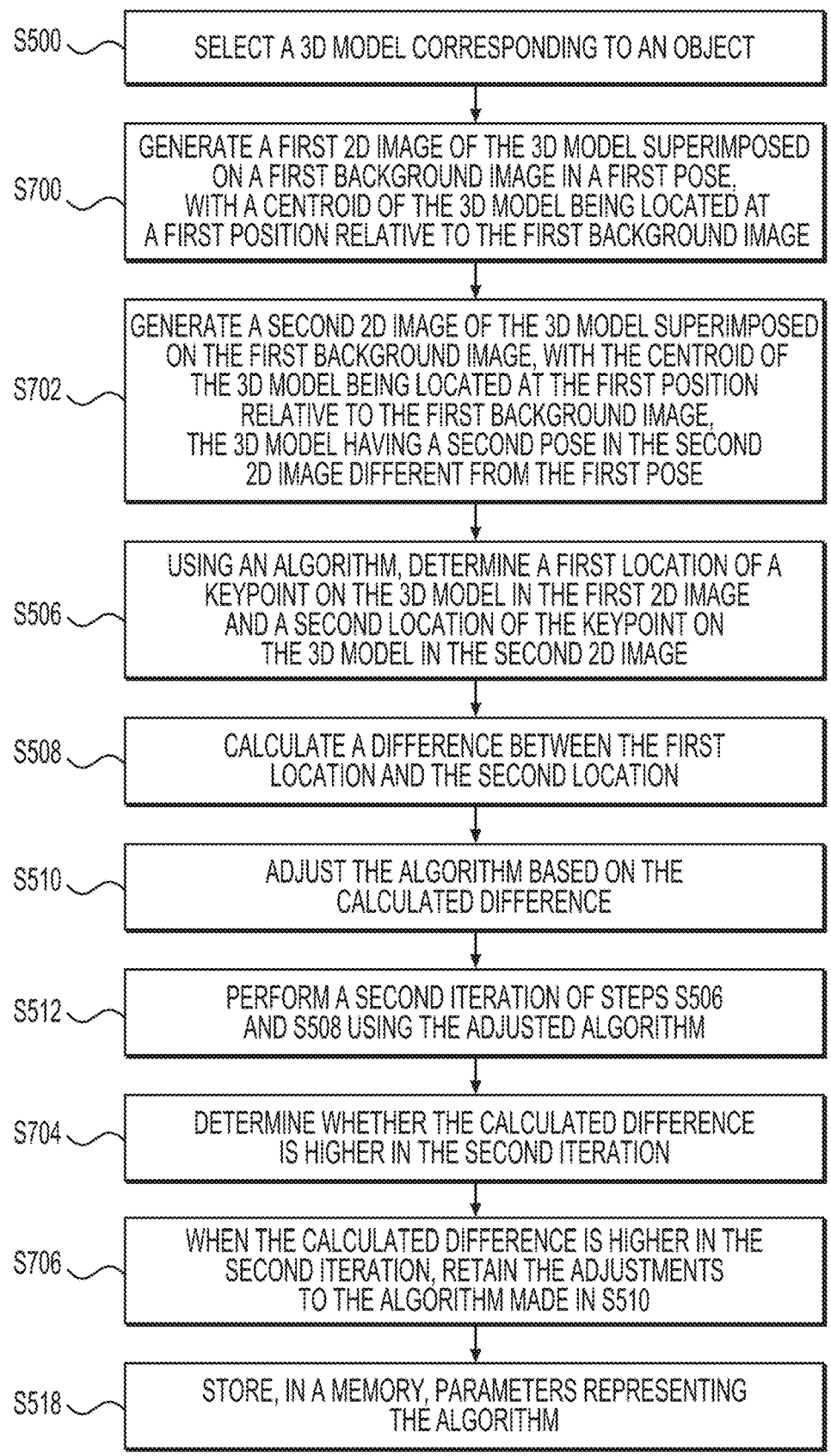
FIG. 7A is a flow diagram of an example method of performing step S416 of FIG. 4.

FIGS. 7A and 7B describe the methods of conducting this training. First, selection of the 3D model is performed as described above (S500). Next, a first 2D image 604 of the 3D model 600 superimposed on a first background image 602 in a first pose is generated, with a centroid 800 of the 3D model being located at a first position relative to the first background image 602 (S700). Then, a second 2D image 604' of the 3D model 600 superimposed on the first background image 602 is generated, with the centroid 800 of the 3D model 600 being located at the first position relative to the first background image 602, the 3D model 600 having a second pose in the second 2D image 604' different from the first pose (S702). Next, locations of keypoint 612 are determined, the algorithm is adjusted, and the keypoint location calculation is repeated, using steps S506-S512 described above.

In this embodiment, it is desirable that a different pose be determined for first 2D image 604 and second 2D image 604'. Thus, it is desirable that the calculated difference be higher after adjustment of the algorithm, instead of lower as in the previous embodiment. Thus, it is determined whether the calculated difference is higher for the adjusted algorithm in step S704 and this difference can be a part of a loss function where the individual keypoints are also compared with their respective ground-truths. This may be done for multiple keypoints, and an aggregate generated, as described above. If the calculated difference is higher using the adjusted algorithm, the adjustments are retained (S706). Thereafter, the detection algorithm is stored in memory according to step S518, described above. In some embodiments, when the calculated difference is lower for the second iteration (i.e. adjusted algorithm), the adjustments to the algorithm are undone (S706'). In this situation, a different adjustment to the algorithm may be performed. In similar embodiments, the adjustments are not undone, and the algorithm is just further updated until further improvements cannot be achieved or an error threshold is acceptably low.

The various embodiments described herein provide a system for auto-training an object detection algorithm using synthetic images. The embodiments reduce the amount of user involvement in training the algorithm, remove the time and effort needed to capture multiple images of an actual object using each particular AR device to be trained to detect the object, and remove the need to have an actual copy of the object and the AR device to be trained.

Some embodiments provide a non-transitory storage medium (e.g. ROM 121, RAM 122, identification target storage section 139, etc.) containing program instructions that, when executed by a computer processor (e.g. CPU 140, processor 167, CPU 301), perform the methods described herein.

Although the invention has been described with reference to embodiments herein, those embodiments do not limit the scope of the invention. Modifications to those embodiments or different embodiments may fall within the scope of the invention.

What is claimed is:

1. A non-transitory computer readable medium that embodies instructions that cause one or more processors to perform a method comprising:
    (a) selecting a 3D model corresponding to an object;
    (b1) generating a first 2D image of the 3D model in a first pose with a first background image;
    (c1) generating a second 2D image of the 3D model in the first pose with the first background image, the second 2D image having a different texture on the 3D model than the first 2D image;
    (d1) determining, using an algorithm, a first location of a first feature on the 3D model in the first 2D image and a second location of a second feature on the 3D model in the second 2D image;
    (e1) calculating a difference based on the first location and the second location;
    (f1) adjusting parameters representing the algorithm based on the difference calculated in step (e1);
    (g1) iterating steps (d1) to (f1) at least twice;
    (i) determining that the first background image has a higher clutter constant than a second background image different from the first background image;
    (b2) generating a third 2D image of the 3D model in the first pose with the second background image;
    (c2) generating a fourth 2D image of the 3D model in the first pose with the second background image, the fourth 2D image having a different texture on the 3D model than the third 2D image;
    (d2) determining, using the algorithm, a third location of a third feature on the 3D model in the third 2D image and a fourth location of a fourth feature on the 3D model in the fourth 2D image;
    (e2) calculating a difference based on the third location and the fourth location;
    (f2) adjusting parameters representing the algorithm based on the difference calculated in step (e2);
    (g2) iterating steps (d2) to (f2) at least twice and fewer times than a number of iterations performed in step (g1);
    (h) storing, in a memory, the parameters representing the algorithm, the parameters causing the differences in steps (e1) and (e2) to be lowest among the iterations performed in steps (g1) and (g2), respectively, or lower than or equal to a threshold.

2. The non-transitory computer readable medium according to claim 1, wherein in the second 2D image, the 3D model is textureless.

3. The non-transitory computer readable medium according to claim 2, wherein in the first 2D image, the 3D model textured.

4. The non-transitory computer readable medium according to claim 1, wherein the 3D model has a first texture in the first 2D image and a second texture different from the first texture in the second 2D image.

5. The non-transitory computer readable medium according to claim 1, wherein classification information for the first 2D image and second 2D image is included in the algorithm.

6. The non-transitory computer readable medium according to claim 1, wherein the first background image is selected to blend with the second texture.

7. The non-transitory computer readable medium according to claim 1, wherein in steps (d1), (d2), (e1), and (e2), multiple keypoints as the feature are used, and the differences calculated in steps (e1) and (e2) are based on aggregations of the multiple keypoints.

8. The non-transitory computer readable medium according to claim 1, wherein the calculations in steps (e1) and (e2) are loss functions.

9. A non-transitory computer readable medium that embodies instructions that cause one or more processors to perform a method comprising:
    (a) selecting a 3D model corresponding to an object;
    (b1) generating a first 2D image of the 3D model superimposed on a first background image in a first pose, with a centroid of the 3D model being located at a first position relative to the first background image;
    (c1) generating a second 2D image of the 3D model superimposed on the first background image, with the centroid of the 3D model being located at the first position relative to the first background image, the 3D model having a second pose in the second 2D image different from the first pose;
    (d1) determining, using an algorithm, a first location of a first feature on the 3D model in the first 2D image and a second location of a second feature on the 3D model in the second 2D image;
    (e1) calculating a difference based on the first location and the second location;
    (f1) adjusting parameters representing the algorithm based on the calculated difference calculated in step (e1);
    (g1) iterating steps (d1) to (f1) at least twice; and
    (i) determining that the first background image has a higher clutter constant than a second background image different from the first background image;
    (b2) generating a third 2D image of the 3D model superimposed on the second background image in a third pose, with the centroid of the 3D model being located at second position relative to the second background image;
    (c2) generating a fourth 2D image of the 3D model superimposed on the second background image, with the centroid of the 3D model being located at the second position relative to the second background image, the 3D model having a fourth pose in the fourth 2D image different from the third pose;
    (d2) determining, using the algorithm, a third location of a third feature on the 3D model in the third 2D image and a fourth location of a fourth feature on the 3D model in the fourth 2D image;
    (e2) calculating a difference based on the third location and the fourth location;
    (f2) adjusting parameters representing the algorithm based on the difference calculated in step (e2);
    (g2) iterating steps (d2) to (f2) at least twice and fewer times than a number of iterations performed in step (g1);

(h) storing, in a memory, parameters representing the algorithm, the parameters causing the differences in steps (e1) and (e2) to be highest among the iterations performed in steps (g1) and (g2), respectively, or higher than or equal to a threshold.

10. The non-transitory computer readable medium according to claim 9, wherein the 3D model is textureless in the first 2D image and the second 2D image.

11. The non-transitory computer readable medium according to claim 9, wherein the 3D model has a same texture in both the first 2D image and the second 2D image.

12. The non-transitory computer readable medium according to claim 11, wherein the first background image is selected to blend with the texture.

13. The non-transitory computer readable medium according to claim 9, wherein classification information for the first 2D image and second 2D image is included in the algorithm.

14. The non-transitory computer readable medium according to claim 9, wherein the second pose is the first pose flipped 180° in one direction.

15. The non-transitory computer readable medium according to claim 9, wherein in steps (d1), (d2), (e1), and (e2), multiple keypoints as the feature are used, and the differences calculated in steps (e1) and (e2) are based on aggregations of the multiple keypoints.

16. The non-transitory computer readable medium according to claim 9, wherein the calculations in steps (e1) and (e2) are loss functions.

* * * * *